(12) United States Patent
Miller

(10) Patent No.: US 6,510,551 B1
(45) Date of Patent: Jan. 21, 2003

(54) SYSTEM FOR EXPRESSING COMPLEX DATA RELATIONSHIPS USING SIMPLE LANGUAGE CONSTRUCTS

(75) Inventor: David L. Miller, Colorado Springs, CO (US)

(73) Assignee: ChannelPoint, Inc., Colorado Springs, CO (US)

( * ) Notice: Subject to any disclaimer, the term of this patent is extended or adjusted under 35 U.S.C. 154(b) by 0 days.

(21) Appl. No.: 09/218,871

(22) Filed: Dec. 22, 1998

(51) Int. Cl.[7] ................................................. G06F 9/44
(52) U.S. Cl. ........................................ 717/114; 709/328
(58) Field of Search ............................ 717/1, 100–119; 707/2, 101, 103; 709/310–320, 328

(56) References Cited

U.S. PATENT DOCUMENTS

| | | | |
|---|---|---|---|
| 5,291,583 A | 3/1994 | Bapat | 717/137 |
| 5,339,430 A | 8/1994 | Lundin et al. | 709/332 |
| 5,361,350 A | 11/1994 | Conner et al. | 70/103 R |
| 5,437,025 A | 7/1995 | Bale et al. | 707/103 R |
| 5,473,777 A | 12/1995 | Moeller et al. | 709/328 |
| 5,659,751 A | 8/1997 | Heninger | 709/332 |
| 5,710,925 A | 1/1998 | Leach et al. | 709/316 |
| 5,805,899 A | 9/1998 | Evans et al. | 717/170 |

*Primary Examiner*—Gregory Morse
*Assistant Examiner*—Hoang-Vu Antony Nguyen-Ba
(74) *Attorney, Agent, or Firm*—Stuart T. Langley; William J. Kubida; Hogan & Hartson LLP

(57) ABSTRACT

A programming environment including a source code programming language comprising a plurality of programming constructs. A first set of constructs within the programming language are for expressing procedural operations performed on specified data. A second set of constructs within the programming language are for expressing complex data relationships of the specified data. A compiler receives programmed source code comprising user-selected and arranged portions of the first and second set of constructs and generating machine readable code capable of implementing the procedural operations and complex data relationships expressed by the source code.

21 Claims, 6 Drawing Sheets

SYSTEM FOR EXPRESSING COMPLEX DATA RELATIONSHIPS USING SIMPLE LANGUAGE CONSTRUCTS

BACKGROUND OF THE INVENTION

1. Field of the Invention

The present invention relates, in general, to database software and computer program products and, more particularly, to software that relies on complex data relationships to obtain program data and instructions required for desired operation.

2. Relevant Background

Software applications comprise coded instructions that are executable on a computer to process data (i.e., inputs) to generate a desired result (i.e., outputs) Increasingly, portions of the data and portions of the coded instructions (i.e., components) may be stored in a distributed fashion in database structures. These database structures are coupled directly or through networks to the computer on which the application is executing. Application behavior is defined by a data model that describes the data sources and relationships between the data sources. With the trend towards increasingly distributed systems, application and database development increasingly require a means to express the data model that the application relies on. The present invention involves methods, systems, and computer program products used to access and manipulate data within an application that uses complex data sources and data models.

In prior solutions, the application developer must rely heavily on database management systems (DBMS) and a knowledge of database connectivity to implement an application using distributed data and program components. DBMS systems hide the low-level features of the underlying data base and its connectivity to the required target data. Using a DBMS, data can be accessed by higher level database query languages such as structured query language (SQL). While this eases the burden of managing multiple data sources, it has compounded the problem of managing complex data models. Application developers must still express the complex data relationships using a combination of program language constructs and database-specific query language constructs. In practice, the application developer is forced to use either embedded query language (e.g., SQL) constructs or other vendor proprietary DBMS-specific application programming interfaces (APIs). Both of these solutions fail to address the complex data modeling requirements that now exist and require the application developer to have extensive database and query language knowledge.

Another trend in application development is to enable "domain experts" to author domain-specific application software. Domain experts are individuals with specific knowledge and experience in the domain in which the application is to operate. Hence, domain experts have specific knowledge about the desired behavior of applications. Typically, the domain expert is not a programmer, and so describes the desired application behavior to a programmer who has general knowledge of the program constructs, operating systems, and platforms that define the environment in which the application is to operate. Unfortunately, the translation of an application from a specification defined by a domain expert into code authored by a programmer often results in unacceptable program code. Further, the domain expert cannot verify the programmers work and the programmer cannot verify the domain experts work further complicating the development process. Hence, a need exists for methods and computer implemented systems enabling a domain expert to author application software without reliance on a computer programmer.

As an example in the insurance industry, a "rating methodology" is typically developed by actuaries and business analysts who understand the insurance industry and customer needs. Typically the methodology is expressed in domain-specific terms and expressions that can be communicated easily between the analysts and actuaries. However, these domain specific terms and expressions do not readily translate into computer readable program code. Hence, computer programmers translate the rating methodology into a software implementation. This translation process is costly, error prone, and time consuming. Analysts who designed the original methodology cannot independently verify that the software translation is an accurate representation of the methodology. Moreover, the resulting software often contains machine specific program code that is not portable between mainframes, workstations, and personal computers. These factors alone or in combination tend to slow down the development cycle so that new applications as well as updates and modifications of existing applications take unacceptably long to complete. A need exits for a systems and method for application development that provides a more streamlined, shorter development cycle.

COBOL is widely used for common business applications because none of the programming languages that have become popular in the last three decades aid in overcoming the limitations set out above. Most of the advances embodied in popular programming languages since COBOL (e.g., BASIC, FORTRAN, C, C++, and JAVA) offer improvements to COBOL that are simply irrelevant to common business applications such as insurance rating that function essentially to transform database inputs into database outputs. Principle functionality desired in these applications includes:

Simplified database access integrated into the language;
Support for direct manipulation of sets of records without complex loops, arrays, and the like;
Runtime configuration based on business logic and constraints;
Rule-based deduction;
Automatic generation of user interface components; and
Portability across all levels of enterprise computing.

Conceptually, many limitations of the prior art result because the problem to be solved, i.e., implementing a business process, is merged with the programming logic that is used to access data required by the business process. Because of this merger, the application developer must know where the data and/or program components reside and what relationship(s) those data and program components have to the location of other data and program components. Small changes in the business process due to expanded product portfolios, legislative changes or business practices required significant programming effort to implement.

Similarly, porting an existing application to a new computer system required a similar level of programming effort. Such changes alter the data model and force the application developer to make significant changes to the expression of that data model in the application. Hence, it becomes prohibitive to take advantage of new hardware and operating environments. As a result, many existing business systems remain on older mainframe computer systems implemented in COBOL code that is bulky, costly and difficult to maintain. A need exists for expressing the complex data relationships used by a business application using simple language constructs.

Further difficulty arises because the application developer programs in a generic programming environment that fails to provide simple constructs to express common relationships that are inherent in databases. Typical programming environments such as COBOL, C, C++ and Java(tm) include a variety of program constructs that ease the expression of procedural processes. However, even modern programming languages such as Java fail to provide programming constructs that directly express classic database relationships such as "many-to-one", group membership, and "many-to-one" relationships. Because of this, existing programming languages require the application developer to write to the DBMS using the vendor proprietary DBMS-specific API or query language. A need exists for a programming environment that expresses complex data relationships as built-in language constructs.

SUMMARY OF THE INVENTION

Briefly stated, the present invention involves a programming environment including a source code programming language comprising a plurality of programming constructs. A first set of constructs within the programming language are for expressing procedural operations performed on specified data. A second set of constructs within the programming language are for expressing complex data relationships of the specified data. A compiler receives programmed source code comprising user-selected and arranged portions of the first and second set of constructs and generating machine readable code capable of implementing the procedural operations and complex data relationships expressed by the source code.

DETAILED DESCRIPTION OF THE PREFERRED EMBODIMENTS

The present invention is directed to a programming environment that enables an application developer to define inter-data relationships through an easy to understand and easy to express class syntax. The class syntax is used to author class definitions. In operation, the class definitions are used to create class instances at run time. In accordance with the present invention, the class instances can be persistent (i.e., saved in a database) or local (i.e., transient, non-persistent instances). A feature of the present invention is that both transient and persistent class instances are responsive to a common set of programming language constructs. In this way, the application developer does not need to have specific knowledge of whether a class instance is local or persistent.

Another feature of the present invention is that the persistent classes define data constructs that support not only the data attributes of the local classes, but additional attributes that define classic data relationships such as membership, "many-to-many" connections, and "many-to-one" connections. In this manner an application developer can program to the interface of persistent class without or any specific knowledge of the relationship(s) between the data manipulated by the class.

This combination of features allows an application developer to author an application that accesses data through both persistent and local data class instances without any knowledge of the data source or the data model describing the data relationships. In this manner the present invention greatly reduces the programming knowledge required to implement an application and lowers the entry barriers for domain-experts to implement, debug, and modify business applications.

Figure 1:
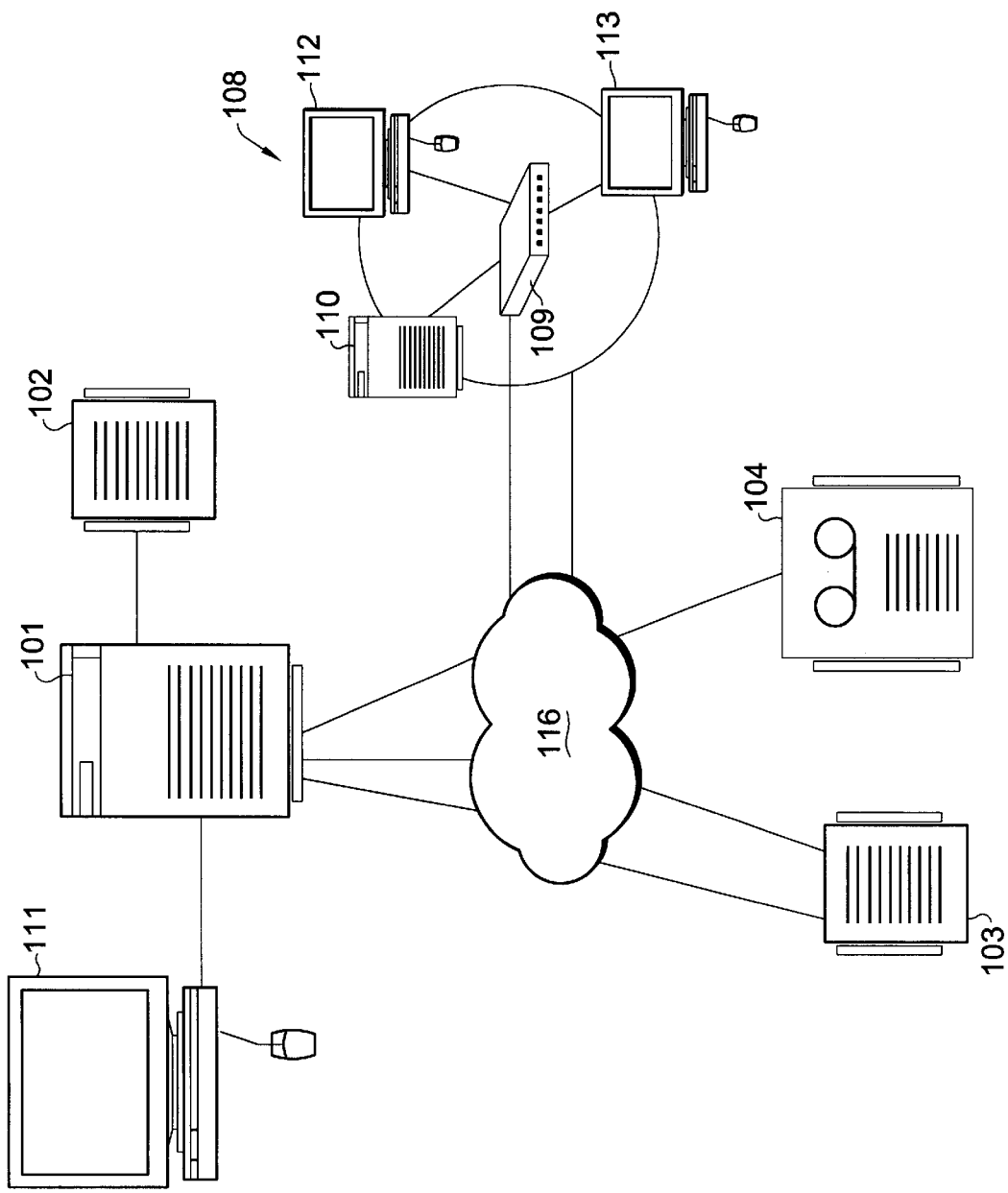
FIG. 1 shows a networked computer environment implementing the system, method and devices in accordance with the present invention.

FIG. 1 illustrates a typical distributed computing environment in which the present invention may be implemented. In overview, FIG. 1 shows general and/or special purpose computers, workstations or personal computers that are connected via communications links of various types. Programs and data, many in the form of objects, are made available by various members of the system for execution and access by other members of the system.

Figure 6:
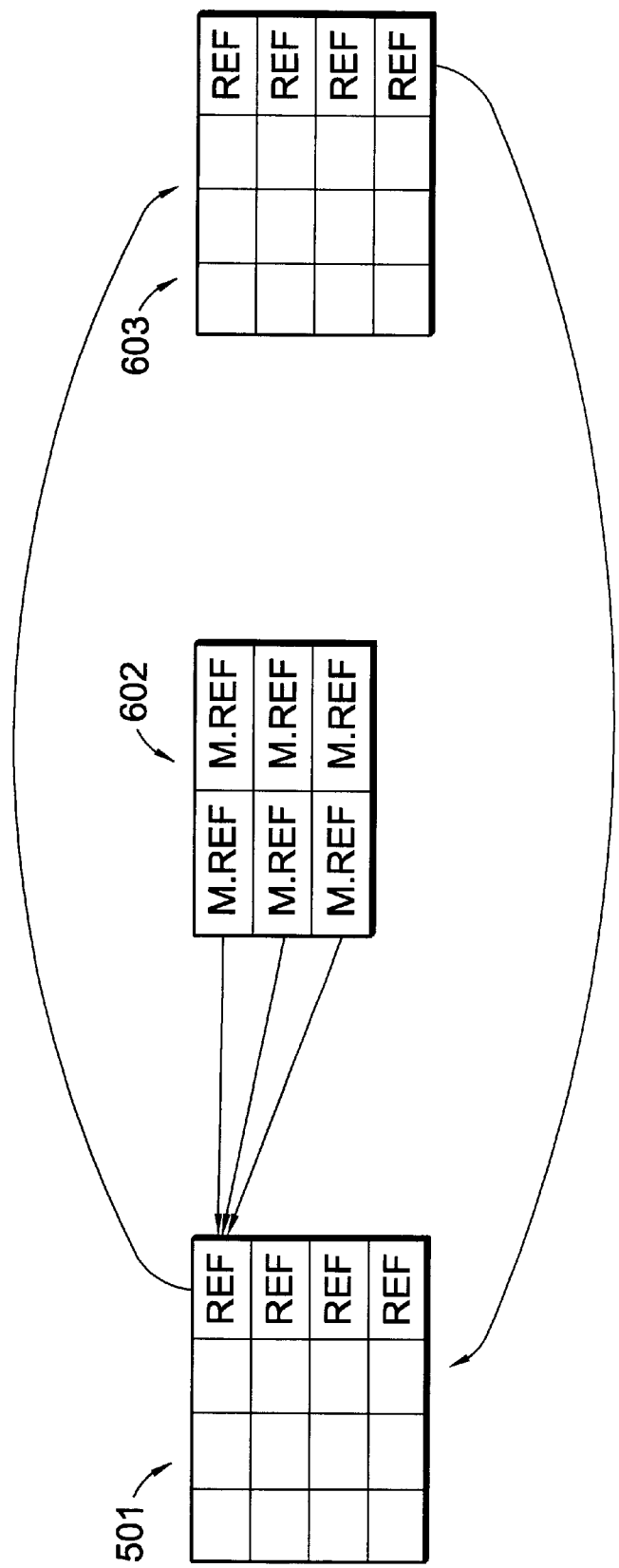
FIG. 6 shows references in many-to-many relationships implemented in accordance with the present invention.

The representative computer system shown in FIG. 1 includes a workstation or personal computer (PC) 111 and associated server 101 coupled together through an FIG. 6 shows references in many-to-many relationships implemented in accordance with the present invention. appropriate communications link. The workstation 101 may include input/output ("I/O"), central processing unit ("CPU") and memory sections (not shown) and an associated monitor for interacting with a user. A variety of input devices, such as a mouse or keyboard, form a portion of the workstation 101 and are coupled to the I/O section to provide user input data.

Workstations 111 typically includes mass storage devices such as CDROM and hard disk devices (not shown) for read only and read-write storage. Additionally, workstation 111 may access external mass storage devices such as disk array 102 that is directly connected to server 101 and disk array 103 and tape storage 104 that are coupled through network or fiber 116. Network 116 may be implemented as a wide area network (WAN), local area network (LAN) and may use any available technology for establishing communication links such as Ethernet, Fibre Channel (FC), Internet Protocol (IP), asynchronous transfer mode (ATM), digital subscriber line (DSL), and the like. Network 116 may also couple to external LAN or WAN subnetworks such as LAN 108 including workstations 112 and 113 and a server 110 coupled together by a hub 109.

The computer program products containing mechanisms to effectuate the apparatus and methods of the present invention may reside in the memory portions of the workstations 111, 112 and 113 as well as servers 101 and 110 or any of the various associated computer mass storage devices such as tape drive 104, disk arrays 102 and 103. The computer program products containing mechanisms to effectuate the apparatus and methods of the present invention are readily embodied in magnetic, optical, magneto-optical or other available machine readable encoding systems.

Figure 2:
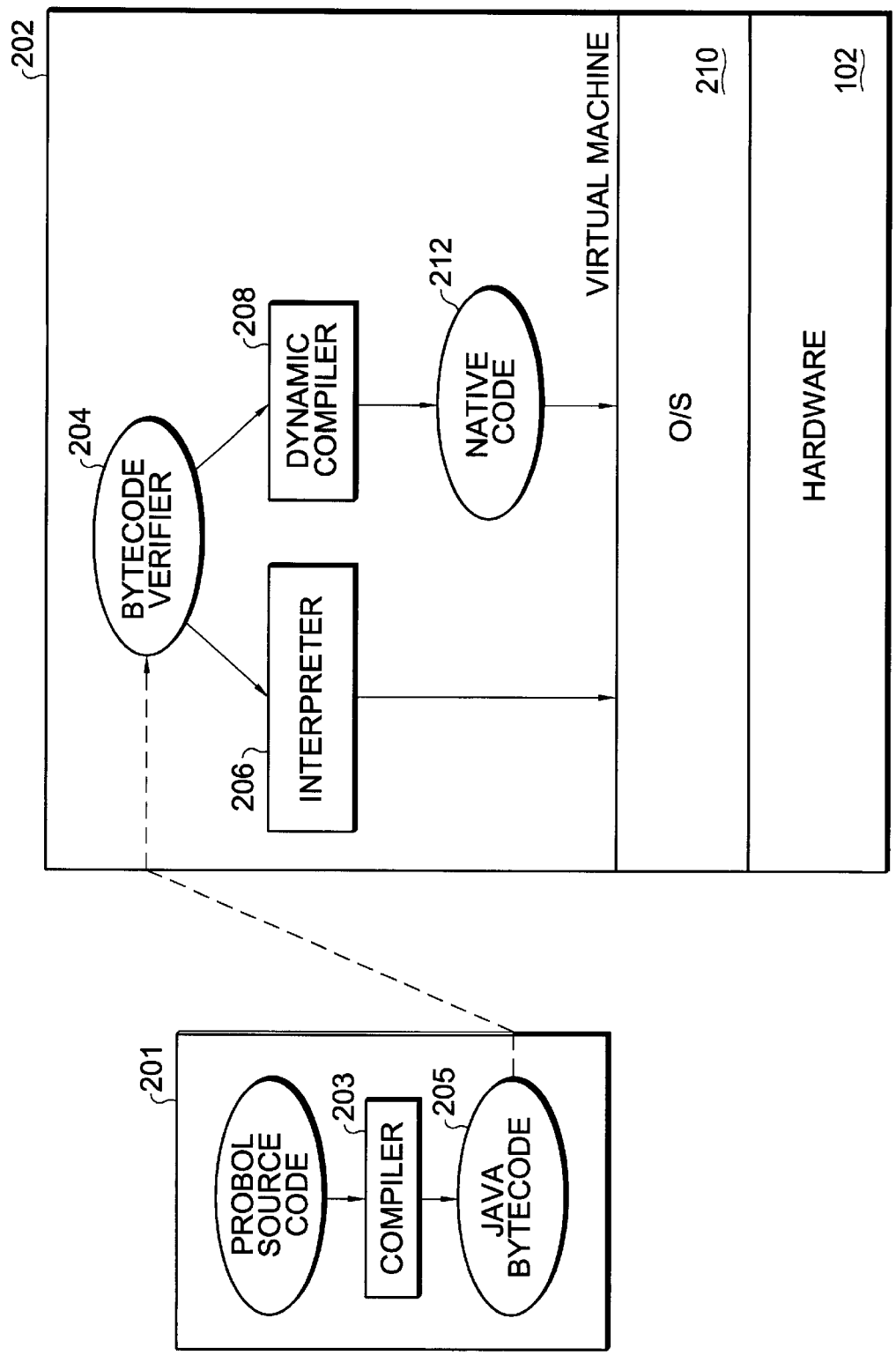
FIG. 2 illustrates basic program devices in accordance with an embodiment of the present invention.

The present invention is described in terms of a new computer language called PROBOL™, although the teachings of the invention can be applied an implemented in a number of other programming environments including JAVA 4 programming environment. PROBOL™ is a trademark of Channelpoint, Inc. the assignee of the present invention and JAVA is a trademark of Sun Microsystems, Inc., Palo Alto, Calif. The present invention is desirably implemented using modular program components as shown in FIG. 2. Modular components can be reused and are easier to maintain. Updates can be made to only one place in the code, and problems usually have only one source.

FIG. 2 illustrates an exemplary programming environment including a "compile time environment" 201 and a "run time environment" 202. In the preferred implementation, developing and running an application involves two steps. A programmer or domain expert enters in PROBOL™ source code that is stored, for example, as ASCII data. The source code is an expression of the applications desired behavior authored using programming constructs defined by the programming environment in accordance with the present invention. The source code comprises selected ones of the available constructs selected and arranged by the programmer.

Two general classes of constructs are available in the programming environment in accordance with the present invention. First, general purpose programming constructs for expressing basic functions and processes useful in manipulating data. Second, database-specific constructs are provided for expressing complex data relationships typical of database operations. A significant feature of the present invention is that it provides a source-level programming language that combines basic programming constructs with database constructs so that the program author can express the complex data relationships simply and directly. While special purpose development tools are often used, a text editor may suffice in some applications.

Although source code authoring is illustrated as a single step it typically and desirably involves authoring multiple separate modules that are interlinked by cross references within the modules. Some of these modules comprise library modules that are predefined components within the programming environment. Other modules comprise user-authored components that are available for reuse. Yet other modules, often called "main modules" are authored by the application developer or domain expert to call and interlink these components in a manner that expresses a desired application behavior. As described hereinafter, the programming environment in accordance with the present invention enables the construction of components such as local class 301 and database class 302 that encapsulate complex data relationships so that the author of the "main module" or the like that uses these components need not be aware of the complex data relationships expressed in the components.

The source code is converted by a compiler 203 into machine readable code that implements the application as expressed by the programmer. The complex data relationships are compiled to SQL statements or statements that access a particular DBMS API, for example and then expressed in Java compliant code. In this manner, compiler 201 performs the difficult task of expressing the complex data relationships in a vendor proprietary DBMS-specific manner and hides this complexity from the application developer.

While it is contemplated that compiler 203 could generate machine specific executable code, in the preferred implementation shown in FIG. 2 the machine readable code 205 comprises Java bytecodes typically provided in Java class files. The Java bytecodes are readable by a virtual machine rather than a physical machine, but provide significant advantages in portability and platform independence. Java bytecodes are compact and portable which makes them an ideal form for storing and transferring a program in a network computer environment such as shown in FIG. 1.

The bytecode representation 205 is then transferred to the runtime environment 202 to be processed by a program such as a Java Virtual Machine (JVM). All JVMs understand the same bytecodes, so the bytecode form of a Java program can be run on any platform with a JVM. In this way, a JVM is a generic execution engine for Java bytecode—the JVM can be written once for a given platform, and then any bytecode program can be run by it. As in conventional JVMs, the preferred implementation includes a bytecode verifier 204 and a bytecode interpreter 206 that optionally runs in parallel a dynamic compiler 208 to provide interpreted native code (i.e., machine code) in a conventional manner. Unlike the interpreted code from interpreter 206, optimized code from compiler 208 can be saved for later reuse in code cache 212.

Although the present invention impacts all portions of the programming environment shown in FIG. 2, of significant importance are the features that impact the step(s) involved in authoring source code in step 201. The programming environment in accordance with the present invention, like other general purpose programming environments, provides constructs for performing basic operations like mathematical calculations and conditional logic. These basic operations are coded in "expressions" 300 (shown in FIG. 3) that are essential building blocks of applications. Although a complete understanding of the types of expressions is not necessary for an understanding of the present invention, by way of example expressions include constructs that manipulate arithmetic data (e.g., math functions), string data (e.g., concatenation and length functions), logical functions (e.g., Boolean functions), relationship functions (e.g., greater than, less than), and the like. It is contemplated that domain-specific expressions will be included in any particular implementation to ease the programming burden on the application developer.

Figure 3:
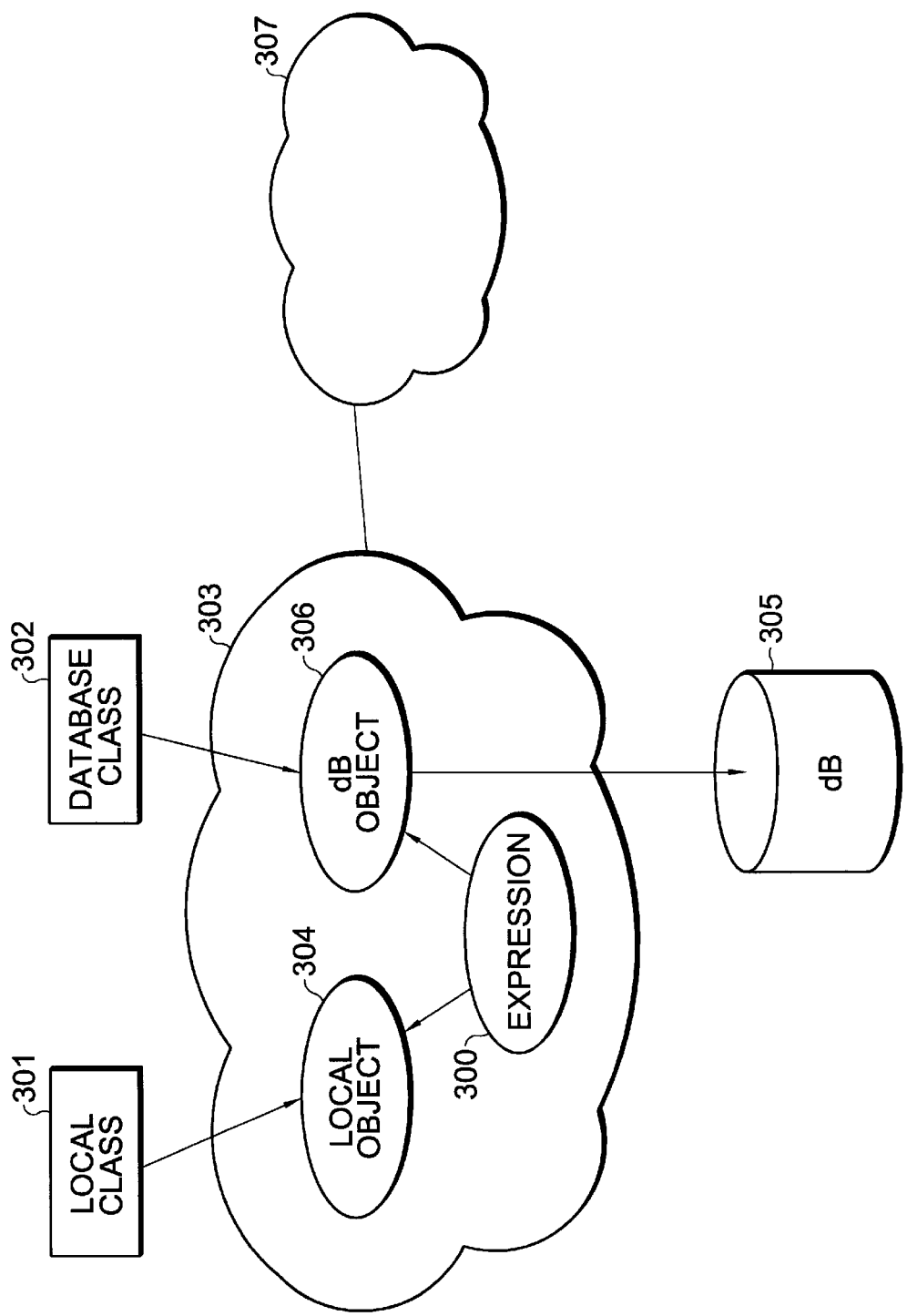
FIG. 3 illustrates in block diagram for interaction of program devices to implement a method in accordance with the present invention.

Cloud 303 in FIG. 3 represents an application executing in memory of a computer system such as workstation 111 shown in FIG. 1. Expressions 300 are used to define other constructs and carry out data operations. Expression 300 makes calls to local class 301 and database class 302 to create class instances illustrated by local object 304 and database object 306, respectively. One feature of the present invention is that expressions interact with local class 301 and database class 302 in a substantially identical manner so that the application developer need not be aware of whether a particular object created by an expression is a local object 304 or a database object 306.

An important feature in accordance with the present invention is that the class definition of database class 302 can be altered at runtime. For example, the attributes of a particular database class, and therefore the attributes of any instance of that class, can be dynamically altered.

In a particular implementation the database class is altered, recompiled and stored back to the database. The recompilation process ensures that the modified database class is consistent with the original database class. In effect, the modified class 302 is like a subclass or extension of the original class 302. Subsequent instances of the altered database class inherit the modified attributes of the modified class description. This enables the application's behavior to be modified dynamically without halting the application or recompiling an entire application. In effect, the application can evolve to meet changing needs as opposed to more conventional processes which rewrite and recompile the application.

Constructs within application 303 can also access library 307 which contains predefined library functions and procedures. Library functions and procedures may themselves create class instances and operate similarly to expressions 300 and are implemented as separate constructs primarily to encourage code modularity and reuse. During application execution, local objects 304 store the data used by expressions and defined constructs during program execution.

While local objects 304 in accordance with the present invention can manipulate table data in a variety of ways and provide a result to the calling expression 300, they cannot directly change data that is outside the program itself (e.g., data in a database). To change external data the present invention uses database objects 306 that are instances of database classes 302. Database classes 302 describe table data that can be used in a calculation, just like local classes 301, but they are associated with a database table 305. As a result, when information is changed in a database object 306, the change is also made to its associated database table 305.

Local objects 304 may include in their definition a reference to a database class 302. In this manner, a particular instance of the local object 304 may include data from database 305, but cannot persistently manipulate that data without going through a database object 306. However, a database object 306 will not include a reference to a local class 301 because any particular instance of a database class 302 does not know that the local class 301 exists because local class 301 is not persistent.

Expressions 300 include several commands, such as SAVE, MODIFY, and DELETE, that control the way a database class 302 interacts with its associated table 305. A SAVE command stores the object (e.g., the current values of its variables) to an associated table 305. A MODIFY command alters data in the object. A DELETE command deletes the object from persistent storage 305. From perspective of an expression 300, and hence the application developer writing expressions 300, the principle difference between local objects 304 and database objects 306 is that database objects 306 will respond to a SAVE command by storing the database object 306 in persistent storage 305 whereas a local object 304 cannot respond to a save command. A local object 304 can be modified, and a DELETE command effects a local object by deleting it from cache, but does not effect any database table 305. Other commands available in expressions 300, such as WHEN, FOREACH, and TYPEACTION, control the flow of command execution and are used without regard to whether the object is a local objects 301 or a database object 306.

One reason that database classes 302 and local classes 301 can be treated equally is that local classes 301 and database classes 302 encapsulate complex data relationship information. Prior programming languages do not include constructs for expressing these relationships and therefore forced the application developer to access the vendor proprietary DBMS-specific definition and query languages or the DBMS API to express complex data relationships.

A first effect of this is to enable simple to write database classes 302 as the programmer does not need to express these relationships in a series of SQL commands, for example. A second effect of this is that local, transient classes 301 can be treated substantially similarly to database classes and can be used to represent complex data models even where there is no underlying DBMS. In prior general purpose programming environments (e.g., Visual Basic, C++ or Java) the task of expressing these complex relationships without a DBMS was both difficult and non-intuitive thereby taking application development out of the hands of domain experts.

To enable the expression of complex data relationships the programming environment in accordance with the present invention includes constructs that define a number of complex data types. Classic database relationships include simple references, many-to-many connections, membership, and one-to-many connections. In accordance with the present invention, class definitions include attributes that indicate that instances of the class will implement the indicated relationships.

Figure 4A:
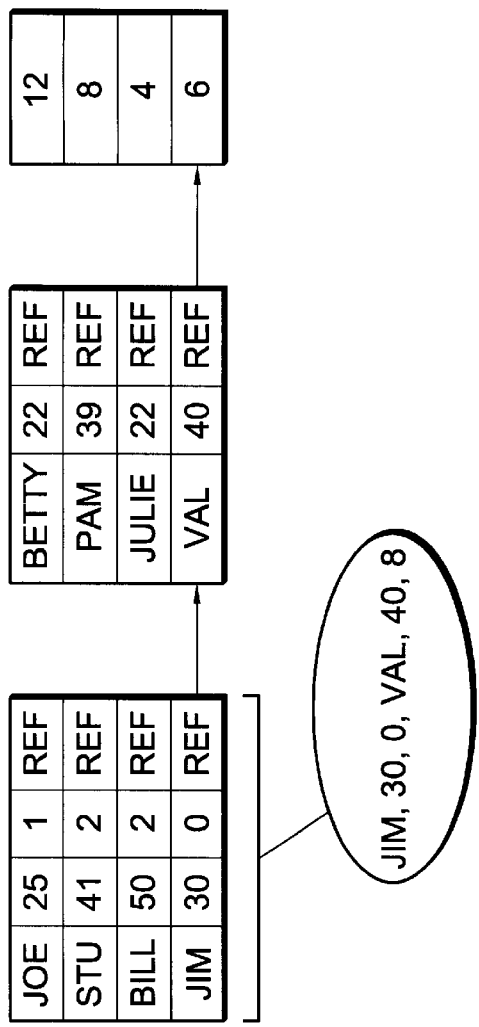
FIG. 4a and FIG. 4b show example data structures illustrating the operation of the present invention.

FIG. 4a illustrates a simple reference relationship akin to a reference to a foreign key in a conventional DBMS. In the case of local objects 301, the class definition includes a pointer or other available reference expression pointing to another class. To ease description, the class that contains the reference is referred to herein as a "reference class" and the class being pointed to is referred to as the "support class". In the particular implementation, the reference class cannot be a subclass, however, the support class can be either a top-level class or a subclass.

With a simple reference, any instance of the reference class is actually an instance of the reference class in combination with an instance of the support class. FIG. 4a shows a reference class 401 called "Employer" which is used to store information about employers, and a first support class 403 called "Secretary" used to store information about the employer's secretary. A third support class 405 called "Time_in_job" is used to support information about duration of the Secretary's employment. To implement the first reference a simple reference using a keyword "REFERENCE TO" is added to the Employer class definition. To implement the second reference the keyword "REFERENCE TO" is added to the Secretary class definition. In the illustration the Time_in_job class does not define any reference attributes. Any number of references can be chained in this manner within the class definition and so completely hidden from the application programmer.

To create an instance of the class Employer an expression 300 includes the Employer class as one of its arguments. The relationships shown in FIG. 4a are automatically traversed so that the instance 407 of Employer Jim includes the sequence of values "Jim, 30, 0, Val, 40, 6". In memory, the object 407 does not include the references themselves, but instead contains the data referred to in the support classes 403 and 405.

Figure 4B:
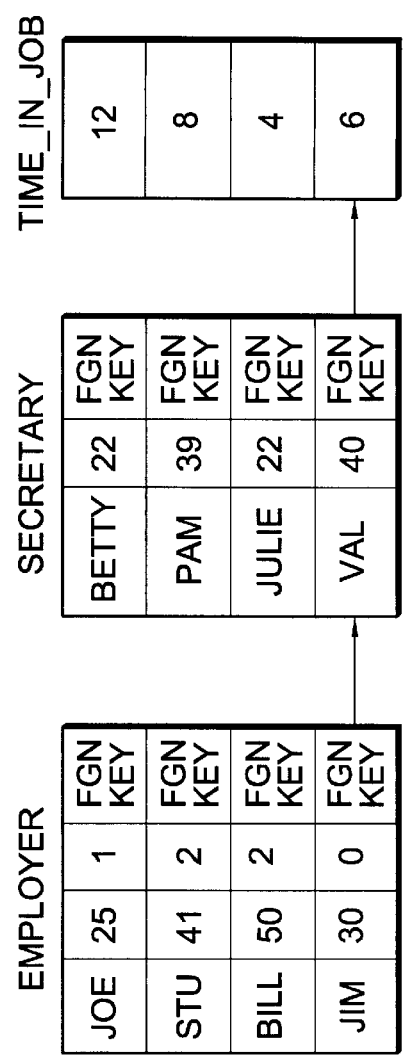

FIG. 4b shows an implementation in which the classes described in FIG. 4a are implemented as database classes. The principle difference is that database classes are associated with a database table structure shown in FIG. 4b. The database table 411 named Employer includes an entry for each employer and a field for each variable defined by the class. One field in table 411 includes a pointer to the Secretary table 413. Similarly, one field in Secretary table 413, includes a pointer to Time_in_job table 415. As will be appreciated, the data structure shown in FIG. 4a greatly resembles the table structure shown in FIG. 4b. As set out hereinbefore, the same expression 300 directed at a database class 302 will result in an instance having the same content and behavior as instance 407, however, the data will have come from (and will be stored to) database tables 411, 413 and 415.

Figure 5A:
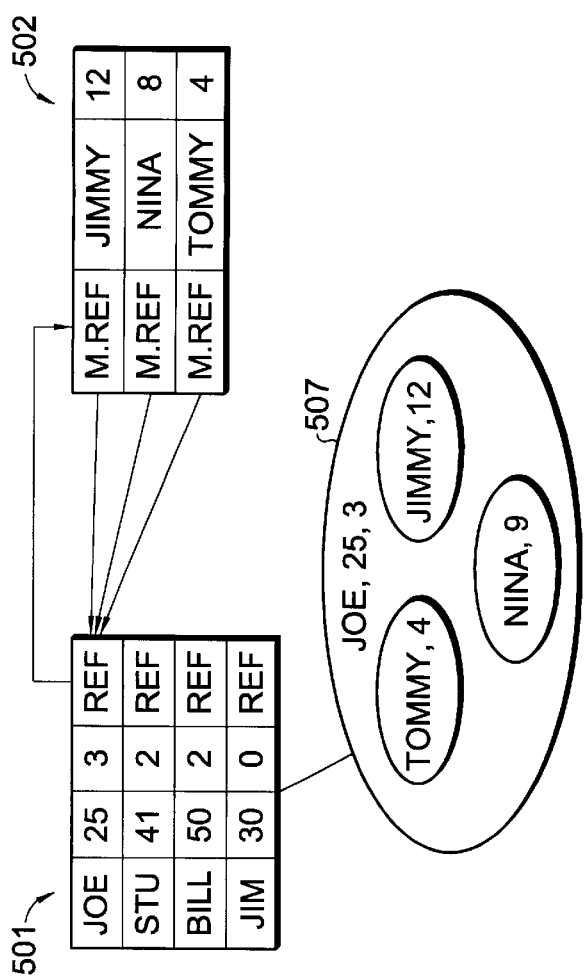
FIG. 5a and FIG. 5b show example data structures illustrating additional operation in accordance with the present invention.

A more complex data relationship is the classic "one-to-many" relationship which enables a reference object to refer to a sequence of objects. FIG. 5a illustrates a parent class 501 (i.e., the reference class) that includes a one-to-many reference (indicated as REF in FIG. 5a) to a child class 502 (i.e., the support class. In a particular implementation, the one-to-many reference is indicated by using the attribute "USING BACK REFERENCE" in the variable definition with an argument identifying the child class 502.

Figure 5B:
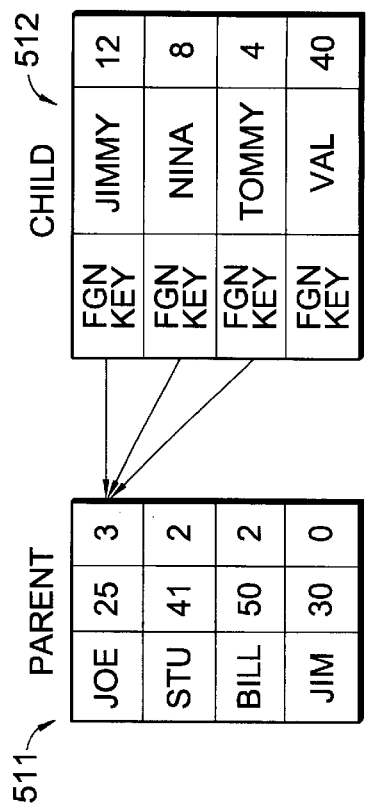

Conversely, child class 502 includes a membership reference (indicated as O-M REF in FIG. 5a) to parent class 501. An instance of the parent class automatically traverses the one-to-many relationship to create instances in the child class where the M.REF pointer refers back to the appropriate instance of the parent class. An instance 507 of "JOE", for example, in the parent class includes the variables from the parent class 501 in combination with the sequence instances of the child class 502 from the support class. In the database table view shown in FIG. 5b, each entry in the child table 512 includes a reference back to the associated entry in the parent table 511.

A still more complex data relationship is the classic "many-to-many" relationship. Many-to-many relationships are useful in a conceptual model to quickly capture what the business world sees. A many-to-many relationship is impossible in a relational database. It requires an unknown number of links in both directions and violates the 1st normal form. In a logical model, a many-to-many relationship is replaced by an associative entity.

Many-to-many relationships describe a relation between two classes that allows each of them to create a sequence from instances of the other. Both classes are considered reference classes and both must be top-level, not subclasses. In a many-to-many reference the support class does not hold any data, but exists only to store the links between the two reference classes. In accordance with the present invention, a many-to-many relationship can be defined in a database class by assigning a class variable the attribute "MANY TO MANY". The MANY TO MANY attribute uses a forward and a back reference to the support class 602 shown in FIG. 6. The first class 601 includes a REF that defines a many-to-many connection to the second class 603, a forward reference to support class 602, and a back reference from support class 602 as shown. A similar connection is expressed in the definition of second class 602. Also, the definition of support class 603 includes membership references to the first and second class.

The present invention is usefully understood in by way of a specific example involving a hotel room reservation application. The class descriptions shown in Table 1 illustrate how the application may be defined using local classes.

TABLE 1

| LIBRARY MODULE HotelManagement IS | |
|---|---|
| PUBLIC CLASS Hotel IS | # Definition of Hotel Class. |
| ATTRIBUTE rooms IS {Room} | # variable "rooms" in class |
| END CLASS | "Hotel" is a set of Room instances |
| PUBLIC CLASS Reservation IS | # Definition of |
| ATTRIBUTE registeredGuest IS STRING | "Reservation" Class. |
| ATTRIBUTE checkIn IS DATE | |
| ATTRIBUTE checkOut IS DATE | |
| ATTRIBUTE rooms IS | # variable "rooms" in class |
| {Room.Reservations) | "Reservation" is a set of |
| END CLASS | "reservation" instances of the support class "Room" |
| PUBLIC CLASS Room IS | # Definition of "Room" |
| ATTRIBUTE roomnumber IS INTEGER | Class. |
| ATTRIBUTE floor IS INTEGER | |
| ATTRIBUTE smoking IS BOOLEAN | |
| ATTRIBUTE maids IS {STRING} | # variable "rooms" in class |
| ATTRIBUTE reservations IS {Room} | "Reservation" is a set of |
| END CLASS | "reservation" instances of |
| END MODULE | the support class "Room" |

As seen in Table 1, the data model is expressed directly in the class descriptions by specifying variables that include instances or sequences of instances of other local classes defined in the module. In contrast, Table 2 shows database class descriptions to implement an analogous data structure to that shown in FIG. 2.

TABLE 2

| LIBRARY MODULE HotelManagement IS | |
|---|---|
| PUBLIC DATABASE CLASS Hotel IS | # Definition of Hotel Class. |
| TABLE hotel | # Declare table association |
| KEY hotelID | |
| ACCESS FOR "ProbolAdmin" IS READ, WRITE, CREATE, DELETE | |
| ATTRIBUTE rooms IS {Room} | # variable "rooms" in class |
| USING BACK REFERENCE Room.hotel | "Hotel" is a set of Room instances from the Room |
| END CLASS | Database class |
| PUBLIC DATABASE CLASS Reservation IS | # Definition of |
| TABLE reservation | "Reservation" Class. |
| KEY resID | |
| ACCESS FOR "ProbolAdmin" IS READ, WRITE, CREATE, DELETE | |
| ATTRIBUTE registeredGuest IS STRING | |
| ATTRIBUTE checkIn IS DATE | |
| ATTRIBUTE checkOut IS DATE | |
| ATTRIBUTE rooms IS | # variable "rooms" in class |
| {Room.Reservations} | #"Reservation" is a set of |
| END CLASS | #"reservation" instances of #the support database class #"Room" |

TABLE 2-continued

LIBRARY MODULE HotelManagement IS

| | |
|---|---|
| PUBLIC DATABASE CLASS Room IS | # Definition of "Room" |
|   TABLE Room | #Class. |
|   KEY roomID | |
|   ACCESS FOR "ProbolAdmin" IS READ, WRITE, CREATE, DELETE | |
|   MEMBERSHIP REFERENCE hotel IS | #Declare membership |
|   REFERENCE TO Hotel.rooms | #relationship to dB class |
|   ATTRIBUTE roomnumber IS INTEGER | #Hotel |
|   ATTRIBUTE floor IS INTEGER | |
|   ATTRIBUTE smoking IS BOOLEAN | |
|   ATTRIBUTE maids IS {STRING} | # variable "rooms" in class |
|   ATTRIBUTE reservations IS {Room} | #"Reservation" is a set of |
| END CLASS | #"reservation" instances of |
| | #the support database class |
| | "Room" |
| DATABASE CLASS Room Reservation | #Definition of support class |
| SUBCLASS of Room, Reservation IS | # |
|   TABLE roomReservation | # |
|   KEY roomResID | # |
|   ACCESS FOR "ProbolAdmin" IS READ, WRITE, CREATE, DELETE | # |
|   MEMBERSHIP REFERENCE reservation IS | # |
| REFERENCE TO Reservations.rooms | #Declare Membership |
|   MEMBERSHIP REFERENCE room IS | references (e.g., forward |
| REFERENCE TO Room.reservations | and back references) |
| END CLASS | # |
| | # |
| END MODULE | |

The database class description is somewhat more complex than the local class description, however, it can be appreciated that even the database class description uses programming constructs that express the data model without requiring any vendor proprietary DBMS-specific knowledge or SQL expertise. Because database class description shown in TABLE 2 is constructed in the same programming language set used to build local class descriptions shown in Table 1, the two descriptions are highly compatible, and in fact interchangeable in many instances.

Tables 1 and 2 can be used to compare the coding complexity required to access local and database classes in accordance with the present invention as compared to a solution written in conventional SQL. It should be noted that the compared SQL code doesn't provide the data relationships that were are used. Hence, the SQL versions below would in practice be larger and more complex. Below is an example that both reads and writes transparently to the database. As you can see from the example the same expressions can be used on either the local or database version of the class definitions.

TABLE 3

| Task: | Expression: |
|---|---|
| Locate the first reservation where the registered guest is "John Doe. | Reservation r1 IS FIRST(r IN Reservation WHERE r.registeredGuest="JohnDoe") |
| Locate all of the rooms that "John Doe " has reserved. | r1.rooms |
| Add another room to the reservation. | MODIFY r1 ASSIGN(rooms <-- @r1.rooms, room3)) |

TABLE 4

| Task: | SQL Expression: |
|---|---|
| Locate the first reservation where the registered guest is "John Doe. | Select reservation.resID, reservation.aclID, reservation.registeredguest, reservation.checkIn, reservation.checkout from reservation where reservation.registeredguest ='John Doe' |
| Locate all of the rooms that "John Doe " has reserved. | Select roomReservation.roomResID, room.roomID, roomReservation.aclID, room.aclID from roomreservation, room where (roomreservation.reservation = 4398063617922) and (roomreservation.room = room.roon-JD) |
| Add another room to the reservation. | insert into roomreservation (roomResID, aclID, reservation, room) values (4398063617971, 2, 4398063617922, 4398063617919) insert into roomreservation (roomResID, aclID, reservation, room) values (4398063617972, 2 4398063617922, 4398063617920) insert into roomreservation (roomResID, aclID, reservation, room) values (4398063617973, 2, 4398063617922, 4398063617921) delete from roomreservation where roomReservation.roomResID = 4398063617965 delete from roon-treservation where roomReservation.roomR ResID = 4398063617964 |

As is apparent from a comparison of Tables 3 and 4, the programming environment in accordance with the present invention drastically reduces the complexity of data modeling in a fashion that alleviates the need for the application developer to manage the inter-data relationships of a complex data model. This allows the developer to rapidly develop applications by not having to understand the inherit complexity of the data that is being used.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer implemented method for data processing in a computer including a processor and associated memory, the method comprising the steps of:

defining a local data class;

defining a persistent data class;

instantiating a local data object from the local data class;

at runtime, instantiating a first persistent object from the persistent data class, wherein the first persistent object and the local object have a substantially identical interface;

dynamically altering at least one attribute of the persistent data class at runtime; and at runtime, instantiating a second persistent object from the altered persistent data class, wherein the first persistent object and the second persistent object have the substantially identical interface and have differing behavior.

2. The computer implemented method of claim 1 further comprising:

providing procedural code that calls to the local and persistent classes without regard to whether the called class is local or persistent to cause the instantiation of a class instance.

3. The computer implemented method of claim 1 wherein the step of defining comprises storing programming constructs that define structure, behavior, and interface of the data object.

4. The computer implemented method of claim 1 wherein the step of instantiating comprises storing in memory a data structure that conforms to a structure of the class definition and is subject to a behavior defined in the class definition.

5. The computer implemented method of claim 1 wherein at least one of the persistent and local class instance is static and specifies data tat cannot be altered at runtime.

6. The computer implemented method of claim 1 wherein at least one of the persistant and local class instance is dynamic and holds data that can be altered at runtime.

7. The computer implemented method of claim 1 herein the class definition includes a relationship attribute that associates the class instance with another data object.

8. The computer implemented method of claim 1 wherein the objects' interfaces expose relationships defied in a class definition of the object.

9. A computer implemented method for using an external database on a computer having a processor, a memory coupled to the processor, the method comprising the steps of:

creating an instance of a first data object, the first data object having program constructs expressing data operations performed on transient data values and an interface;

creating an instance of a second data object, the second data object having program constructs expressing data operations performed on persistent data values and an interface, wherein the second data object's interface is compatible with the first data object's interface.

10. The computer implemented method of claim 9 further comprising:

executing procedural code in main memory using the processor to call the first and second objects, wherein the procedural code includes a single set of program constructs to call the instance of the first data object and the instance of the second data object.

11. The computer implemented method of claim 9 further comprising:

storing definitions of the first and second objects in separate class files in an external database.

12. computer implemented method of claim 9 wherein the second data object includes methods for retrieving at least some data from an external database and storing at least some of the data to the database.

13. The computer implemented method of claim 9 wherein the first data object excludes methods for accessing an external database.

14. The computer implemented method of claim 9 wherein the second data object is persistent so that its state is saved in an external database when the second data object is terminated.

15. The computer implemented method of claim 9 further comprising the steps of:

terminating the first data object;

instantiating the fist data object a second time, wherein a state of the first data object begins in a preselected initial state.

16. The computer implemented method of claim 9 wherein the fast data object is static so that a value of its variables is defined by internal variable definitions within the first data object upon instantiation.

17. The computer implemented method of claim 9 wherein the first data object is dynamic so that a value of its variables is defined by external variables obtained by the object after instantiation.

18. A programming environment comprising:

a source code programming language comprising a plurality of programming constructs;

a first set of constructs within the programming language for expressing procedural operations performed on specified data;

a second set of constructs within the programming language for expressing complex data relationships of the specified data;

a compiler receiving programmed source code comprising user-selected and arranged portions of the first and second set of constructs and generating machine readable code capable of implementing the procedural operations and complex data relationships expressed by the source code.

19. The programming environment of claim 18 wherein the second set of constructs comprises a construct for assigning to a variable an attribute indicating a relationship between the variable and an external database object.

20. The programming environment of claim 18 wherein the second set of constructs comprises a construct for assigning to a variable an attribute indicating a one-to-many relationship between the variable and a plurality of external database objects.

21. The programming environment of claim 18 wherein the second set of constructs comprises a construct for assigning to a set of variables an attribute indicating a many-to-many relationship between the set of variables and a plurality of external database objects.

* * * * *